(12) United States Patent
Guo et al.

(10) Patent No.: US 9,577,248 B2
(45) Date of Patent: Feb. 21, 2017

(54) SULFUR-CARBON COMPOSITE FOR LITHIUM-SULFUR BATTERY, THE METHOD FOR PREPARING SAID COMPOSITE, AND THE ELECTRODE MATERIAL AND LITHIUM-SULFUR BATTERY COMPRISING SAID COMPOSITE

(75) Inventors: Yuguo Guo, Beijing (CN); Sen Xin, Beijing (CN); Nahong Zhao, Shanghai (CN); Longjie Zhou, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 35 days.

(21) Appl. No.: 14/361,327

(22) PCT Filed: Nov. 29, 2011

(86) PCT No.: PCT/CN2011/083104
§ 371 (c)(1),
(2), (4) Date: May 29, 2014

(87) PCT Pub. No.: WO2013/078605
PCT Pub. Date: Jun. 6, 2013

(65) Prior Publication Data
US 2014/0342233 A1    Nov. 20, 2014

(51) Int. Cl.

| | | |
|---|---|---|
| *H01M 4/36* | (2006.01) |
| *H01M 4/587* | (2010.01) |
| *H01M 4/58* | (2010.01) |
| *H01M 4/133* | (2010.01) |
| *H01M 4/136* | (2010.01) |
| *C01B 31/00* | (2006.01) |
| *H01M 4/139* | (2010.01) |
| *H01M 4/38* | (2006.01) |
| *H01M 4/62* | (2006.01) |
| *H01M 10/052* | (2010.01) |

(52) U.S. Cl.
CPC .............. *H01M 4/364* (2013.01); *C01B 31/00* (2013.01); *H01M 4/133* (2013.01); *H01M 4/136* (2013.01); *H01M 4/139* (2013.01); *H01M 4/38* (2013.01); *H01M 4/581* (2013.01); *H01M 4/587* (2013.01); *H01M 4/625* (2013.01); *H01M 10/052* (2013.01); *C01P 2004/62* (2013.01); *C01P 2006/12* (2013.01); *C01P 2006/14* (2013.01); *C01P 2006/16* (2013.01); *H01M 4/382* (2013.01); *Y02E 60/122* (2013.01)

(58) Field of Classification Search
CPC ... C01B 31/00; C01P 2004/62; C01P 2006/12; C01P 2006/14; C01P 2006/16; C07D 275/06; C07D 279/02; C07D 417/06; C07D 513/10; H01M 10/052; H01M 4/133; H01M 4/136; H01M 4/139; H01M 4/364; H01M 4/38; H01M 4/382; H01M 4/581; H01M 4/587; H01M 4/625; Y02E 60/122

See application file for complete search history.

(56) References Cited

FOREIGN PATENT DOCUMENTS

| | | |
|---|---|---|
| CN | 101323444 | 12/2008 |
| CN | 101867038 | 10/2010 |

OTHER PUBLICATIONS

B. Zhang, X. Qin, G. R. Li, X. P. Gao. Enhancement of long stability of sulfur cathode by encapsulating sulfur into micropores of carbon spheres, Energy Environ. Sci., 2010, 3, 1531-1537.*
C. Liang, N. J. Dudney, J. Y. Howe. Hierarchically Structured Sulfur/Carbon Nanocomposite Material for High-Energy Lithium Battery, Chem. Mater. 2009, 21, 4724-4730.*
C. Lai, X. P. Gao, B. Zhang, T. Y. Yan, and Z. Zhou. Synthesis and Electrochemical Performance of Sulfur/Highly Porous Carbon Composites, J. Phys. Chem. C 2009, 113, 4712-4716.*
International Search Report for Application No. PCT/CN2011/083104 dated May 17, 2012 (3 pages).

* cited by examiner

*Primary Examiner* — Carlos Barcena
(74) *Attorney, Agent, or Firm* — Michael Best & Friedrich LLP

(57) ABSTRACT

The present invention relates to a sulfur-carbon composite, comprising a pyrolysis microporous carbon sphere (PMCS) substrate and sulfur loaded into said pyrolysis microporous carbon sphere (PMCS) substrate; as well as a method for preparing said sulfur-carbon composite, an electrode material and a lithium-sulfur battery comprising said sulfur-carbon composite.

21 Claims, 5 Drawing Sheets

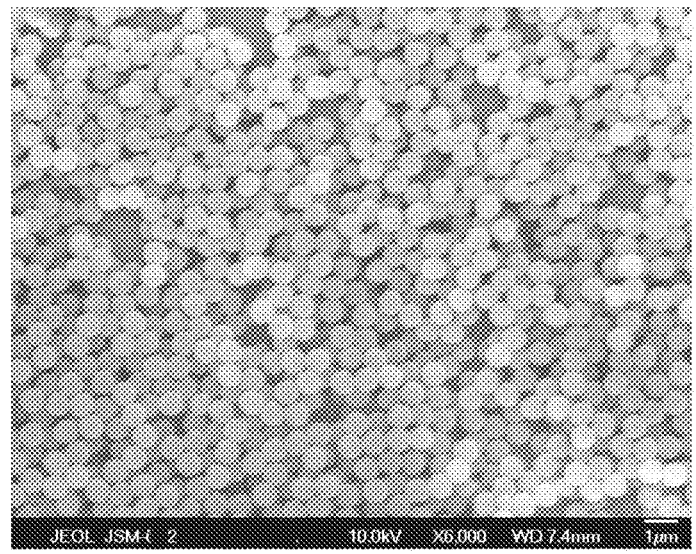
Fig 1. SEM image of PS nanospheres (average diameter: 630 nm)
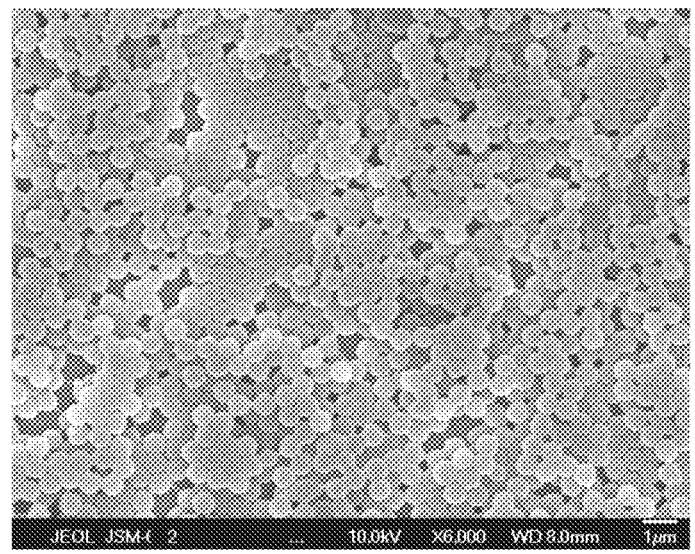
Fig 2. SEM image of SPS nanospheres (average diameter: 630 nm)

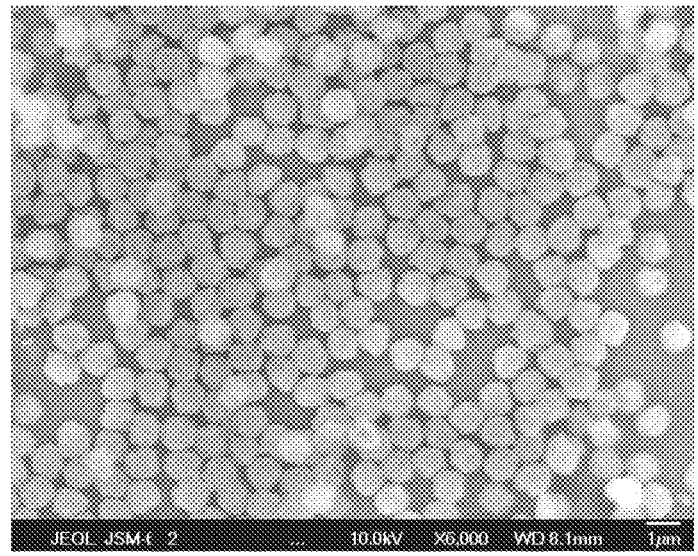
Fig 3. SEM image of SPS@C nanospheres (average diameter: 1000 nm)
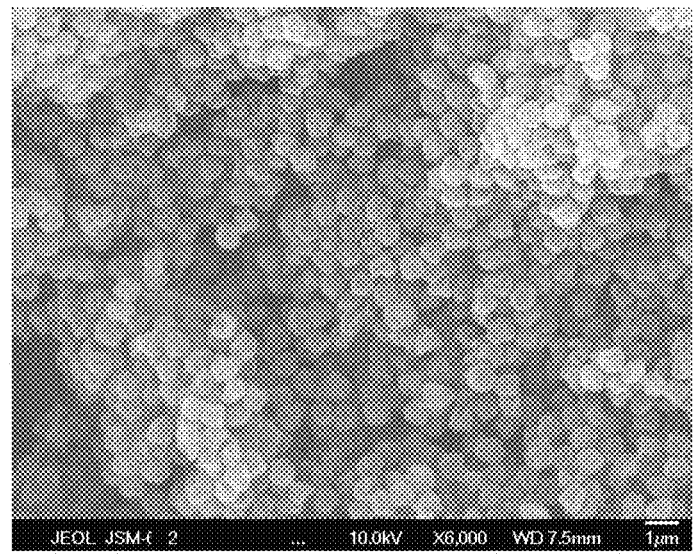
Fig. 4 SEM image of PMCSs (average diameter: 600 nm)

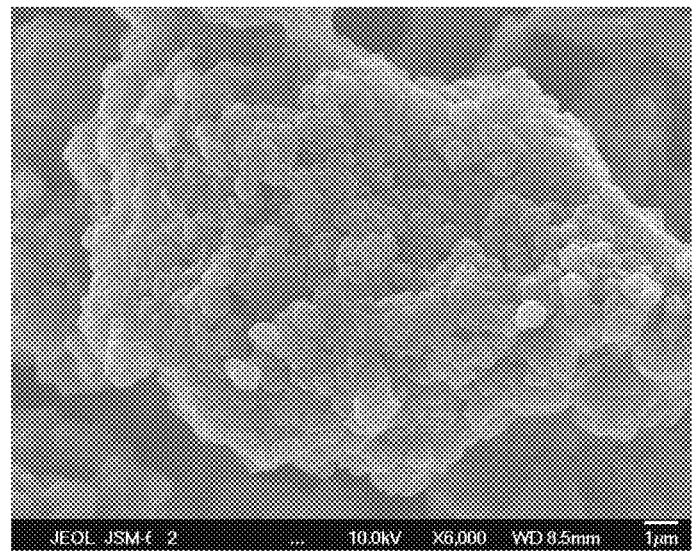
Fig. 5 SEM image of sulfur-carbon composite (sulfur loading rate: 50.23 wt%)

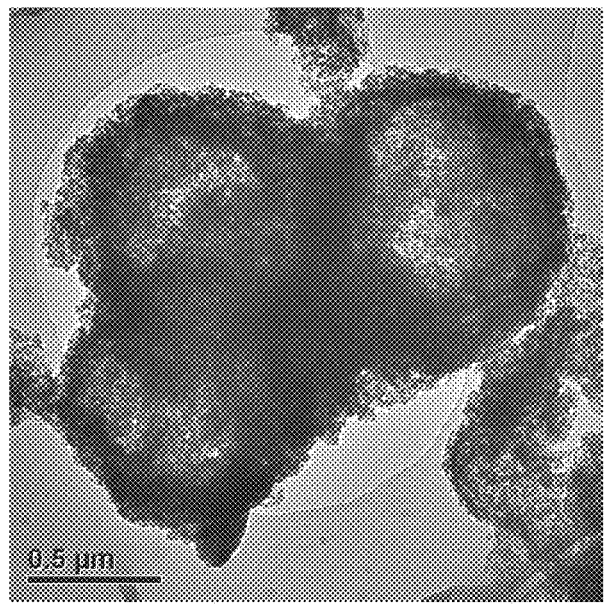
Fig. 6 TEM image of sulfur-carbon composite (sulfur loading rate: 50.23 wt%)
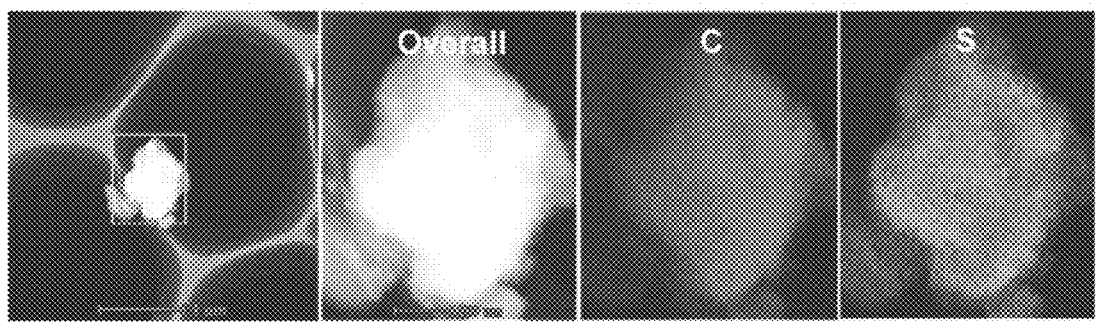
Fig. 7 Elemental mapping of sulfur-carbon composite (sulfur loading rate: 50.23 wt%).

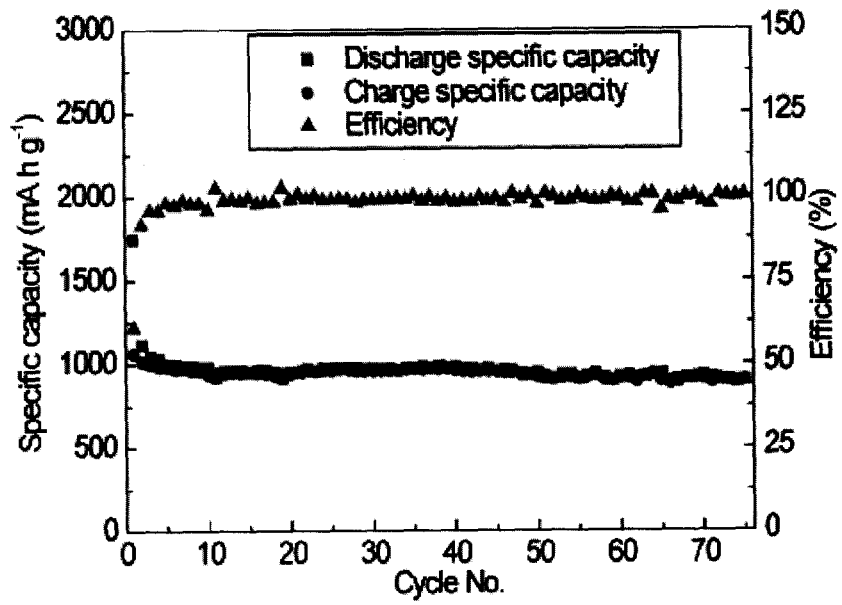
Fig. 8 Cycling performance of sulfur-carbon composite (sulfur load amount: 50.23 wt%) at a discharge-charge rate of 0.1 C
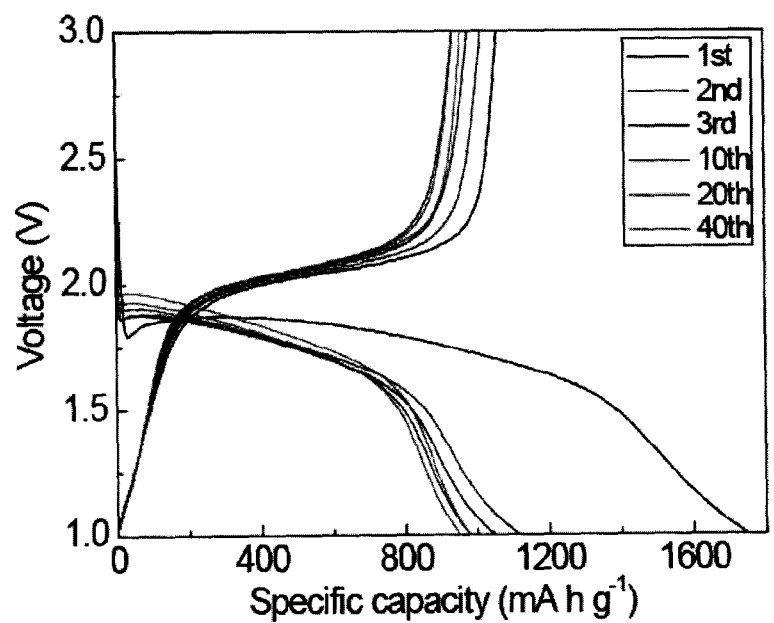
Fig. 9 Charge-discharge curves of sulfur-carbon composite (sulfur load amount: 50.23 wt%) in different cycles at a discharge-charge rate of 0.1 C

SULFUR-CARBON COMPOSITE FOR LITHIUM-SULFUR BATTERY, THE METHOD FOR PREPARING SAID COMPOSITE, AND THE ELECTRODE MATERIAL AND LITHIUM-SULFUR BATTERY COMPRISING SAID COMPOSITE

TECHNICAL FIELD

The present invention relates to a sulfur-carbon composite, comprising a pyrolysis microporous carbon sphere (PMCS) substrate and sulfur loaded into said pyrolysis microporous carbon sphere (PMCS) substrate; as well as a method for preparing said sulfur-carbon composite, an electrode material and a lithium-sulfur battery comprising said sulfur-carbon composite.

BACKGROUND ART

Lithium-sulfur (Li/S) batteries have a theoretical capacity nearly one magnitude higher than that of $LiFePO_4$. Nevertheless, the Li/S system has not yet been implemented in many applications because the following problems still need to be solved before sulfur cathode materials can be practically used in rechargeable lithium batteries: 1) particle size of sulfur should be made as fine as possible to ensure a high utilization rate of sulfur and then a high reversible capacity upon cycling; 2) discharge products of poly-sulfides should be carefully restrained from dissolving into electrolyte to ensure long cycle life; and 3) conductivity of the cathode material should be enhanced to ensure a better rate performance.

In some previous works, ordered mesoporous carbon substrates or carbon hollow spheres were employed to prepare sulfur-carbon composite for Li—S battery, while the dissolution of polysulfides can not be fully prevented, and the preparation procedures were too complicated to be industrialized.

SUMMARY OF INVENTION

It is therefore an object of the present invention to provide a high-energy-density Li—S battery with improved electrochemical performance, which makes it possible to solve the above problems.

This object is achieved by a sulfur-carbon composite, comprising a pyrolysis microporous carbon sphere (PMCS) substrate and sulfur loaded into said pyrolysis microporous carbon sphere (PMCS) substrate.

According to another aspect of the invention, a method for preparing a sulfur-carbon composite is provided, which includes the following steps:
1) providing a pyrolysis microporous carbon sphere (PMCS) substrate; and
2) loading sulfur into said pyrolysis microporous carbon sphere (PMCS) substrate to obtain a sulfur-carbon composite.

According to another aspect of the invention, an electrode material is provided, which comprises the sulfur-carbon composite according to the present invention.

According to another aspect of the invention, a lithium-sulfur battery is provided, which comprises the sulfur-carbon composite according to the present invention.

BRIEF DESCRIPTION OF DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein:

FIG. 1 is a Scanning Electron Microscopy (SEM) image of the polystyrene (PS) nanospheres according to the present invention;

FIG. 2 is a Scanning Electron Microscopy (SEM) image of the sulfonated polystyrene (SPS) nanospheres according to the present invention;

FIG. 3 is a Scanning Electron Microscopy (SEM) image of the carbon-coated sulfonated polystyrene (SPS@C) nanospheres according to the present invention;

FIG. 4 is a Scanning Electron Microscopy (SEM) image of the pyrolysis microporous carbon sphere (PMCS) substrate according to the present invention;

FIG. 5 is a Scanning Electron Microscopy (SEM) image of the sulfur-carbon composite according to the present invention (sulfur loading rate: 50.23 wt %);

FIG. 6 is a Transmission Electron Microscopy (TEM) image of the sulfur-carbon composite having a hollow core-shell structure according to the present invention (sulfur loading rate: 50.23 wt %);

FIG. 7 is the elemental mapping of the sulfur-carbon composite according to the present invention (sulfur loading rate: 50.23 wt %);

FIG. 8 is a plot showing the cycling performance of the sulfur-carbon composite according to the present invention (sulfur load amount: 50.23 wt %) at a discharge-charge rate of 0.1 C; and FIG. 9 is a plot showing the charge-discharge curves of the sulfur-carbon composite according to the present invention (sulfur load amount: 50.23 wt %) in different cycles at a discharge-charge rate of 0.1 C.

DETAILED DESCRIPTION OF PREFERRED EMBODIMENTS

The present invention relates to a sulfur-carbon composite, comprising a pyrolysis microporous carbon sphere (PMCS) substrate and sulfur loaded into said pyrolysis microporous carbon sphere (PMCS) substrate.

In the sulfur-carbon composite according to the present invention, the pyrolysis microporous carbon sphere (PMCS) substrate has a BET specific surface area of 400-1000 $m^2/g$, preferably 550-800 $m^2/g$; a pore volume of 0.3-3.0 $cm^3/g$, preferably 1.2 3.0 $cm^3/g$, more preferably 1.3-2.0 $cm^3/g$; and an average pore diameter of 0.4-1.0 nm, preferably 0.5-0.7 nm. Such microporous structure is beneficial to enhance the utilization of sulfur, and also helps to limit the dissolution of polysulfides into electrolytes, and thus improves the cyclic stability of sulfur.

In the sulfur-carbon composite according to the present invention, the pyrolysis microporous carbon sphere (PMCS) substrate has a diameter of 200-800 nm, preferably 300-600 nm.

In the sulfur-carbon composite according to the present invention, the pyrolysis microporous carbon sphere (PMCS) substrate has a hollow sphere structure.

In the sulfur-carbon composite according to the present invention, sulfur is finely dispersed in the pyrolysis microporous carbon sphere (PMCS) substrate, preferably at a nano-scale level or even a molecular scale level (considering the diameter of a single $S_8$ molecule is around 0.7 nm), which ensures a high electrochemical activity and utilization of sulfur.

The sulfur-carbon composite according to the present invention has a sulfur load amount of 20-90 wt %, preferably 25-80 wt %, more preferably 30-75 wt %, most preferably 33-60 wt %, in each case based on the total weight of the sulfur-carbon composite.

The present invention further relates to a method for preparing a sulfur-carbon composite, which includes the following steps:
1) preparing a pyrolysis microporous carbon sphere (PMCS) substrate; and
2) loading sulfur into said pyrolysis microporous carbon sphere (PMCS) substrate to obtain a sulfur-carbon composite.

1) Preparation of a pyrolysis microporous carbon sphere (PMCS) substrate:

In the method for preparing a sulfur-carbon composite according to the present invention, during step 1) said pyrolysis microporous carbon sphere (PMCS) substrate is prepared by the following steps:
a) preparing polystyrene (PS) nanospheres;
b) sulfonating said polystyrene (PS) nanospheres to obtain sulfonated polystyrene (SPS) nanospheres;
c) applying a microporous carbon coating layer onto the surface of said sulfonated polystyrene (SPS) nanospheres by a hydrothermal reaction to obtain carbon-coated sulfonated polystyrene (SPS@C) nanospheres; and
d) annealing said carbon-coated sulfonated polystyrene (SPS@C) nanospheres to obtain said pyrolysis microporous carbon sphere (PMCS) substrate.

a) Preparation of polystyrene (PS) nanospheres:

Polystyrene (PS) nanospheres are prepared, wherein styrene is polymerized in water in the presence of peroxide initiator to obtain polystyrene (PS) nanospheres. Ammonium persulfate can be preferably used as the peroxide initiator. The polystyrene (PS) nanospheres obtained have an average diameter of 200-1000 nm, preferably 400-800 nm.

In particular, an emulsion free method can be employed to prepare polystyrene (PS) nanospheres, in which certain amounts of styrene and water are mixed and degassed with inert gases, such as nitrogen, argon, carbon dioxide, or any other inert gases commonly used, for 60 min, then a certain amount of initiator ammonium persulfate $((NH_4)_2S_2O_8)$ is added, and the reactants are incubated at a temperature of 50° C.-90° C., preferably about 70° C. for 12-48 h to obtain the polystyrene (PS) nanospheres. The average diameter of the polystyrene (PS) nanospheres (D), and masses of styrene ($m_{St}$), water ($M_W$) and initiator ($M_i$) added are summarized in the following table:

| Average diameter of PS nanospheres (D, nm) | Amount of styrene ($m_{St}$, g) | Amount of water ($m_W$, g) | Amount of initiator ($M_i$, g) |
| --- | --- | --- | --- |
| 400 | 50 | 350 | 0.30 |
| 490 | 50 | 360 | 0.20 |
| 630 | 40 | 360 | 0.15 |
| 710 | 60 | 340 | 0.15 |
| 800 | 80 | 320 | 0.20 | b) Preparation of sulfonated polystyrene (SPS) nanospheres:

The polystyrene (PS) nanospheres obtained in step a) are sulfonated to obtain sulfonated polystyrene (SPS) nanospheres, wherein the polystyrene (PS) nanospheres obtained are mixed with concentrated sulfuric acid, and incubated to obtain sulfonated polystyrene (SPS) nanosphere. The diameter of the sulfonated polystyrene (SPS) nanospheres is identical to that of the polystyrene (PS) nanospheres.

In particular, the polystyrene (PS) nanospheres obtained in step a) are mixed with concentrated sulfuric acid (about 18.4 M) by a mass ratio of 1:10-1:50, preferably about 1:20, and incubated at a temperature of 30° C.-60° C., preferably about 40° C., for 12-48 h, preferably about 24 h, to obtain sulfonated polystyrene (SPS) nanospheres. After the removal of sulfuric acid, said sulfonated polystyrene (SPS) nanospheres can be rinsed with water for several times and dried at 50° C.

c) Preparation of carbon-coated sulfonated polystyrene (SPS@C) nanospheres:

A microporous carbon coating layer is applied by a hydrothermal reaction onto the surface of the sulfonated polystyrene (SPS) nanospheres obtained in step b) to obtain carbon-coated sulfonated polystyrene (SPS@C) nanospheres, wherein an aqueous suspension containing said sulfonated polystyrene (SPS) nanospheres, one or more carbon sources and a surfactant is sealed and heated at a temperature of 150-200° C. for 5 20 h. The microporous carbon coating layer applied has a thickness of 100-250 nm. The carbon-coated sulfonated polystyrene (SPS@C) nanospheres obtained have a diameter of 400-1500 nm, preferably 600-1300 nm.

Before step d), the carbon-coated sulfonated polystyrene (SPS@C) nanospheres obtained can be optionally washed preferably with de-ionized water and dried preferably in an oven at 40-60° C., for example, overnight.

Said aqueous suspension containing said sulfonated polystyrene (SPS) nanospheres, one or more carbon sources and a surfactant can be provided by dissolving one or more carbon sources into water, and adding said sulfonated polystyrene (SPS) nanospheres and a surfactant into the aqueous solution.

As said one or more carbon sources, carbohydrates can be used, which are preferably selected from the group consisting of sucrose, D-glucose, fructose and their mixtures.

Moreover, the amount of said one or more carbon sources used can be easily determined by a person skilled in the art based on the expected thickness of the microporous carbon coating layer, for example 30-150 nm, preferably about 40 nm, 60 nm, 80 nm, 100 nm, 120 nm, 130 nm, or 140 nm. Preferably, the one or more carbon sources can be used in an amount of 100-700 mg per 100 mg sulfonated polystyrene (SPS) nanospheres, more preferably 200-500 mg per 100 mg sulfonated polystyrene (SPS) nanospheres.

The surfactant used here can be selected from the group consisting of an anionic surfactant, such as sodium dodecyl benzene sulfonate (SDBS), oleic acid, sodium Lauryl sulfonate (SLS), and sodium dodecyl sulfate (SDS); a cationic surfactant, such as cetyl trimethyl ammonium bromide; and a nonionic surfactant, such as polyvinyl pyrrolidone (PVP), Tween-40, and Tween-80.

A suitable concentration of the surfactant in the aqueous suspension can be easily determined by a person skilled in the art, for example $0.5 \times 10^{-3}$-$3 \times 10^{-3}$ M (mol/L), preferably $0.6 \times 10^{-3}$-$1.0 \times 10^{-3}$ M.

In particular, a hydrothermal method can be employed to prepare the carbon-coated sulfonated polystyrene (SPS@C) nanospheres. An appropriate amount of carbohydrate is dissolved into the aqueous suspension of SPS nanospheres containing certain amount of surfactant. Then the aqueous suspension is sealed in an autoclave and heated at 150-200° C. for 5 h-20 h to obtain the carbon-coated sulfonated polystyrene (SPS@C) nanospheres, in which a microporous carbon coating layer is formed on said sulfonated polystyrene (SPS) nanospheres. Said carbon-coated sulfonated polystyrene (SPS@C) nanospheres can be washed with de-ionized water and dried in an oven at 40-60° C. overnight. The relationships among the average thickness of the microporous carbon coating layer (d), the average diameter of the sulfonated polystyrene (SPS) nanospheres (D'), and the amounts of the sulfonated polystyrene (SPS) nanospheres ($m_{SPS}$), carbohydrates ($m_{carbo}$) and water ($m_W$) used are as follows:

| Average diameter of SPS nanospheres (D', nm) | Amount of SPS nanospheres ($m_{SPS}$, mg) | Amount of carbohydrates ($m_{carbo}$, mg) | Amount of water ($m_W$, g) | Average thickness of carbon layer (d, nm) |
|---|---|---|---|---|
| 400 | 150 | 750 | 7.5 | 180 |
| 400 | 300 | 800 | 10 | 150 |
| 400 | 450 | 900 | 15 | 100 |
| 490 | 150 | 750 | 7.5 | 210 |
| 490 | 300 | 800 | 10 | 180 |
| 490 | 450 | 900 | 15 | 120 |
| 630 | 150 | 750 | 7.5 | 250 |
| 630 | 300 | 800 | 10 | 200 |
| 630 | 450 | 900 | 15 | 150 |
| 710 | 150 | 750 | 7.5 | 220 |
| 710 | 300 | 800 | 10 | 170 |
| 710 | 450 | 900 | 15 | 125 |
| 800 | 150 | 750 | 7.5 | 190 |
| 800 | 300 | 800 | 10 | 140 |
| 800 | 450 | 900 | 15 | 100 | d) Preparation of pyrolysis microporous carbon sphere (PMCS) substrate:

The carbon-coated sulfonated polystyrene (SPS@C) nanospheres obtained in step c) are annealed to obtain said pyrolysis microporous carbon sphere (PMCS) substrate, and in particular, the carbon-coated sulfonated polystyrene (SPS@C) nanospheres obtained in step c) are annealed at a temperature of 600-1000° C. in an inert atmosphere, such as nitrogen, argon, or any other inert gases commonly used, for 2-4 h with a heating rate of 2-5° C. min, such that sulfonated polystyrene (SPS) inner core is vaporized and said microporous carbon coating layer is further carbonized.

The pyrolysis microporous carbon sphere (PMCS) substrate obtained has a BET specific surface area of 400-1000 $m^2/g$, preferably 550-800 $m^2/g$; a pore volume of 0.3-3.0 $cm^3/g$, preferably 1.2-3.0 $cm^3/g$, more preferably 1.3-2.0 $cm^3/g$; and an average pore diameter of 0.4-1.0 nm, preferably 0.5-0.7 nm. Such microporous structure is beneficial to enhance the utilization of sulfur, and also helps to limit the dissolution of polysulfides into electrolytes, and thus improves the cyclic stability of sulfur.

Moreover, the pyrolysis microporous carbon sphere (PMCS) substrate obtained has a diameter of 200-800 nm, preferably 300-600 nm. Preferably, the pyrolysis microporous carbon sphere (PMCS) substrate obtained has a hollow sphere structure.

2) Load of sulfur

In the method for preparing a sulfur-carbon composite according to the present invention, during step 2) sulfur is loaded into said pyrolysis microporous carbon sphere (PMCS) substrate obtained in step 1), to obtain a sulfur-carbon composite, wherein the pyrolysis microporous carbon sphere (PMCS) substrate obtained in step 1) is mixed with sulfur, sealed and heated at a temperature of 100-190° C. for 5-20 h, so as to finely disperse sulfur into said pyrolysis microporous carbon sphere (PMCS) substrate. After heating, the composite can be naturally cooled down to room temperature to obtain the final product.

There is no limit to the specific form of sulfur used here. As sulfur melts when heated, even bulk sulfur is also usable, but sulfur powder is preferred. The particle size of sulfur powder is not limited either.

In the sulfur-carbon composite obtained, sulfur is finely dispersed in the pyrolysis microporous carbon sphere (PMCS) substrate, preferably at a nano-scale level or even a molecular scale level (considering the diameter of a single $S_8$ molecule is around 0.7 nm), which ensures a high electrochemical activity and utilization of sulfur.

The sulfur-carbon composite obtained has a sulfur load amount of 20-90 wt %, preferably 25-80 wt %, more preferably 30-75 wt %, most preferably 33-60 wt %, in each case based on the total weight of the sulfur-carbon composite.

Moreover, the appropriate mass ratio ($m_S:m_C$) between sulfur and the pyrolysis microporous carbon sphere (PMCS) substrate can be easily determined by a person skilled in the art based on the sulfur load amount expected. Preferably, the mass ratio ($m_S:m_C$) between sulfur and the pyrolysis microporous carbon sphere (PMCS) substrate can be in a range of 1:4-9:1 (corresponding to a sulfur load amount of 20-90 wt %), more preferably 1:3-4:1 (corresponding to a sulfur load amount of 25-80 wt %), even more preferably 3:7-3:1 (corresponding to a sulfur load amount of 30-75 wt %), most preferably 1:2-3:2 (corresponding to a sulfur load amount of 33-60 wt %).

In particular, sulfur and the pyrolysis microporous carbon sphere (PMCS) substrate are mixed by an appropriate mass ratio ($m_S:m_C=1:2-3:1$) in a quartz mortar to obtain a homogeneous mixture, and then the mixture is sealed in a glass container and heated at 100-155° C. for 5-20 h to make sulfur dispersed into the pyrolysis microporous carbon sphere (PMCS) substrate.

The present invention further relates to an electrode material, which comprises the sulfur-carbon composite according to the present invention.

The present invention further relates to a lithium-sulfur battery, which comprises the sulfur-carbon composite according to the present invention.

The pyrolysis microporous carbon sphere (PMCS) substrate has both favorable electric conductivity and relatively smaller pore diameter, thus is very promising in use as the substrate material for sulfur to form the sulfur-carbon composite for Li—S battery. On the one hand, higher electric conductivity can help to reduce the polarization, hence improving the sulfur utilization ratio and then the cycling capacity. On the other hand, smaller pore diameter can help to disperse sulfur into nanoscale and limit the dissolution of polysulfides into the electrolyte, hence bettering the cycling stability of Li—S battery. Moreover, the preparation procedure is simple to implement, and all raw materials are low in price, all these merits make the composite very promising for Li—S batteries.

Potential applications of the composite according to the present invention include high-energy-density lithium ion batteries with acceptable high power density for energy storage applications, such as power tools, photovoltaic cells and electric vehicles.

The following non-limiting examples illustrate various features and characteristics of the present invention, which is not to be construed as limited thereto.

Example A a) 50 g of styrene was added into 350 mL of water, and the mixture was degassed with nitrogen for 60 min before the addition of 0.30 g of $(NH_4)_2S_2O_8$, and the reactants were incubated at 70° C. for 24 h to yield the PS nanospheres with an average diameter of 400 nm;

b) 1 g of as-obtained PS nanospheres were mixed with 20 g of concentrated sulfuric acid (about 18.4 M), and incubated at 40° C. for 24 h to yield SPS nanospheres. After the removal of sulfuric acid, said sulfonated PS nanospheres were rinsed with water for several times and dried at 50° C.;

c) 750 mg of D-glucose (AR grade, Sinopharm Chemical Reagent Co., Ltd.) was dissolved in 7.5 g of water, following by the addition of 150 mg of said SPS nanospheres and 2 mg of SDS (AR grade, Sinopharm Chemical Reagent Co., Ltd.) as the surfactant. Then the aqueous suspension was sealed in an autoclave and heated at 180° C. for 15 h to yield the SPS@C nanospheres, in which a microporous carbon coating layer of 180 nm was formed on said SPS nanospheres. Said SPS@C nanospheres were washed with de-ionized water and dried in an oven at 50° C. overnight;

d) As-obtained SPS@C nanospheres were further annealed at 650° C. in a nitrogen atmosphere for 2 h with a heating rate of 2° C. min to vaporize the SPS inner core and further carbonize the carbon coating layer, and finally yield PMCSs with an average diameter of 420 nm, a BET surface area of 750 $m^2/g$, a pore volume of 1.84 $cm^3/g$, and an average pore diameter of 0.8 nm;

e) Sulfur powder (Aldrich with a purity of >99.995%) and the composite were mixed by an mass ratio of 3:2 in a quartz mortar to yield a homogeneous mixture, after that, the mixture was sealed in a glass container and heated at 150° C. for 18 h to make sulfur dispersed into the composite, and finally yield the sulfur-carbon composite with a sulfur loading rate of 59.71%. After heating, the composite was naturally cooled down to room temperature to obtain the final product.

Electrochemical measurements were performed with coin cells assembled in an argon-filled glovebox. For preparing working electrodes, a mixture of active material, carbon black, and poly-(vinyl difluoride) (PVDF) at a weight ratio of 70:20:10 was pasted on an Aluminum foil. Lithium foil was used as the counter electrode. A glass fiber sheet (GF/D, Whatman) was used as a separator. The electrolyte (product name LB-301, Zhangjiagang Guotai-Huarong New Chemical Materials Co., Ltd.) consisting of a solution of 1 M $LiPF_6$ salt in ethylene carbonate (EC)/dimethyl carbonate (DMC) (1:1 W/W) was used. Galvanostatic cycling of the assembled cells was carried out using a battery testing system in the voltage range of 1-3 V (vs $Li^+/Li$).

When discharged at a rate of 0.1 C, said sulfur-carbon composite demonstrated a first discharge capacity of 1540 mAh/g and reversible capacity of 920 mAh/g calculated based on the mass of sulfur, utilization of active material of 55%, and a cycle life of up to 50.

Example B a) 40 g of styrene was added into 360 mL of water, and the mixture was degassed with nitrogen for 60 min before the addition of 0.15 g of $(NH_4)_2S_2O_8$, and the reactants were incubated at 70° C. for 24 h to yield the PS nanospheres with an average diameter of 630 nm (FIG. 1);

b) 1 g of as-obtained PS nanospheres were mixed with 20 g of concentrated sulfuric acid (about 18.4 M), and incubated at 40° C. for 24 h to yield SPS nanospheres. After the removal of sulfuric acid, said sulfonated PS nanospheres were rinsed with water for several times and dried at 50° C. (FIG. 2);

c) 800 mg of sucrose was dissolved in 10 g of water, following by the addition of 300 mg of said SPS nanospheres and 2 mg of SDS (AR grade, Sinopharm Chemical Reagent Co., Ltd.) as the surfactant. Then the aqueous suspension was sealed in an autoclave and heated at 180° C. for 10 h to yield the SPS@C nanospheres, in which a microporous carbon coating layer of 200 nm was formed on said SPS nanospheres. Said SPS@C nanospheres were washed with de-ionized water and dried in an oven at 50° C. overnight (FIG. 3);

d) As-obtained SPS@C nanospheres were further annealed at 800° C. in a nitrogen atmosphere for 3 h with a heating rate of 5° C./min to vaporize the SPS inner core and further carbonize the carbon coating layer, and finally yield PMCSs with an average diameter of 600 nm (FIG. 4), a BET surface area of 653 $m^2/g$, a pore volume of 1.42 $cm^3/g$, and an average pore diameter of 0.71 nm;

e) Sulfur powder (Aldrich with a purity of >99.995%) and the composite were mixed by an mass ratio of 1:1 in a quartz mortar to yield a homogeneous mixture, after that, the mixture was sealed in a glass container and heated at 155° C. for 12 h to make sulfur dispersed into the composite, and finally yield the sulfur-carbon composite with a sulfur loading rate of 50.23% (FIGS. 5-7). After heating, the composite was naturally cooled down to room temperature to obtain the final product.

Electrochemical measurements were performed in the same way as Example A. When discharged at a rate of 0.1 C, said sulfur-carbon composite demonstrated a first discharge capacity of 1720 mAh/g and reversible capacity of 1010 mAh/g calculated based on the mass of sulfur, utilization of active material higher than 60%, and a cycle life of up to 75 (FIG. 8 and FIG. 9).

The typic microstructures of PS nanospheres (average diameter: 630 nm), SPS nanospheres, SPS@C nanospheres (average diameter: 1000 nm), PMCSs (average diameter: 600 nm) and sulfur-carbon composites (with a sulfur loading rate of 50.23%) were shown in FIGS. 1-7. Cycling performance of said sulfur-carbon composite (sulfur load amount: 50.23% wt %) was plotted in FIG. 8, and Charge-discharge curves of sulfur-carbon composite (sulfur load amount: 50.23 wt %) in different cycles at a discharge-charge rate of 0.1 C were shown in FIG. 9.

Example C a) 80 g of styrene was added into 320 mL of water, and the mixture was degassed with nitrogen for 60 min before the addition of 0.20 g of $(NH_4)_2S_2O_8$, and the reactants were incubated at 70° C. for 24 h to yield the PS nanospheres with an average diameter of 800 nm;

b) 1 g of as-obtained PS nanospheres were mixed with 20 g of concentrated sulfuric acid (about 18.4 M), and incubated at 40° C. for 24 h to yield SPS nanospheres. After the removal of sulfuric acid, said sulfonated PS nanospheres were rinsed with water for several times and dried at 50° C.;

c) 900 mg of fructose was dissolved in 15 g of water, following by the addition of 450 mg of said SPS nanospheres and 4 mg of SDS (AR grade, Sinopharm Chemical Reagent Co., Ltd.) as the surfactant. Then the aqueous suspension was sealed in an autoclave and heated at 160° C. for 20 h to yield the SPS@C nanospheres, in which a microporous carbon coating layer of 100 nm was formed on said SPS nanospheres. Said SPS@C nanospheres were washed with de-ionized water and dried in an oven at 50° C. overnight;

d) As-obtained SPS@C nanospheres were further annealed at 900° C. in an argon atmosphere for 4 h with a heating rate of 1° C. min to vaporize the SPS inner core and further carbonize the carbon coating layer, and finally yield PMCSs with an average diameter of 300 nm, a BET surface area of 590 m$^2$/g, a pore volume of 1.33 cm$^3$/g, and an average pore diameter of 0.70 nm;

e) Sulfur powder (Aldrich with a purity of >99.995%) and the composite were mixed by an mass ratio of 1:2 in a quartz mortar to yield a homogeneous mixture, after that, the mixture was sealed in a glass container and heated at 155° C. for 6 h to make sulfur dispersed into the composite, and finally yield the sulfur-carbon composite with a sulfur loading rate of 33.40%. After heating, the composite was naturally cooled down to room temperature to obtain the final product.

Electrochemical measurements were performed in the same way as Example A. When discharged at a rate of 0.1 C, said sulfur-carbon composite demonstrated a first discharge capacity of 1850 mAh/g and reversible capacity of 1230 mAh/g calculated based on the mass of sulfur, utilization of active material higher than 70%, and a cycle life of up to 50.

While certain embodiments have been described, these embodiments have been presented by way of example only, and are not intended to limit the scope of the inventions. The attached claims and their equivalents are intended to cover all the modifications, substitutions and changes as would fall within the scope and spirit of the invention.

The invention claimed is:

1. A sulfur-carbon composite, comprising a pyrolysis microporous carbon sphere (PMCS) substrate and sulfur loaded into said pyrolysis microporous carbon sphere (PMCS) substrate; wherein said pyrolysis microporous carbon sphere (PMCS) substrate has a BET specific surface area of 550-800 m$^2$/g and a pore volume of 1.2-3.0 cm$^3$/g; wherein said pyrolysis microporous carbon sphere (PMCS) substrate has a hollow core-shell structure.

2. The sulfur-carbon composite of claim 1, wherein said pyrolysis microporous carbon sphere (PMCS) substrate has an average pore diameter of 0.4-1.0 nm.

3. The sulfur-carbon composite of claim 1, wherein said pyrolysis microporous carbon sphere (PMCS) substrate has a diameter of 200-800 nm.

4. The sulfur-carbon composite of claim 1, wherein sulfur is finely dispersed in said pyrolysis microporous carbon sphere (PMCS) substrate.

5. The sulfur-carbon composite of claim 1, wherein said sulfur-carbon composite has a sulfur load amount of 20-90 wt %, based on the total weight of said sulfur-carbon composite.

6. The sulfur-carbon composite of claim 1, wherein said pyrolysis microporous carbon sphere (PMCS) substrate has a diameter of 300-600 nm.

7. An electrode material, comprising the sulfur-carbon composite of claim 1.

8. A lithium-sulfur battery, comprising the sulfur-carbon composite of claim 1.

9. A method for preparing a sulfur-carbon composite according to claim 1, including the steps of:
1) preparing a pyrolysis microporous carbon sphere (PMCS) substrate; and
2) loading sulfur into said pyrolysis microporous carbon sphere (PMCS) substrate to obtain a sulfur-carbon composite.

10. The method of claim 9, wherein during step 1) said pyrolysis microporous carbon sphere (PMCS) substrate is prepared by the following steps:
a) preparing polystyrene (PS) nanospheres;
b) sulfonating said polystyrene (PS) nanospheres to obtain sulfonated polystyrene (SPS) nanospheres;
c) applying a microporous carbon coating layer onto the surface of said sulfonated polystyrene (SPS) nanospheres by a hydrothermal reaction to obtain carbon-coated sulfonated polystyrene (SPS@C) nanospheres; and
d) annealing said carbon-coated sulfonated polystyrene (SPS@C) nanospheres to obtain said pyrolysis microporous carbon sphere (PMCS) substrate.

11. The method of claim 10, wherein during step a) styrene is polymerized in water in the presence of peroxide initiator to obtain polystyrene (PS) nanospheres.

12. The method of claim 10, wherein during step b) said polystyrene (PS) nanospheres are mixed with concentrated sulfuric acid, and incubated to obtain sulfonated polystyrene (SPS) nanospheres.

13. The method of claim 10, wherein during step c) an aqueous suspension containing said sulfonated polystyrene (SPS) nanospheres, one or more carbon sources and a surfactant is sealed and heated at a temperature of 150-200° C. for 5-20 h.

14. The method of claim 13, wherein said surfactant is selected from the group consisting of an anionic surfactant; a cationic surfactant; and a nonionic surfactant.

15. The method of claim 13, wherein carbohydrates are used as said one or more carbon sources.

16. The method of claim 13, wherein said surfactant is selected from the group consisting of sodium dodecyl benzene sulfonate (SDBS), oleic acid, sodium Lauryl sulfonate (SLS), and sodium dodecyl sulfate (SDS), cetyl trimethyl ammonium bromide, and polyvinyl pyrrolidone (PVP), Tween-40, and Tween-80.

17. The method of claim 13, wherein carbohydrates are used as said one or more carbon sources, selected from the group consisting of sucrose, D-glucose, fructose and their mixtures.

18. The method of claim 10, wherein said carbon-coated sulfonated polystyrene (SPS@C) nanospheres are washed and dried after step c) and before step d).

19. The method of claim 10, wherein during step d) said carbon-coated sulfonated polystyrene (SPS@C) nanospheres are annealed at a temperature of 600-1000° C. in an inert atmosphere for 2-4 h with a heating rate of 2-5° C./min.

20. The method of claim 10, wherein during step d) sulfonated polystyrene (SPS) inner core is vaporized and said microporous carbon coating layer is further carbonized.

21. The method of claim 9, wherein during step 2) said pyrolysis microporous carbon sphere (PMCS) substrate is mixed with sulfur, sealed and heated at a temperature of 100-190° C. for 5-20 h, so as to finely disperse sulfur into said pyrolysis microporous carbon sphere (PMCS) substrate.

* * * * *